No. 764,324. PATENTED JULY 5, 1904.
J. F. WARNER.
SAP SPOUT.
APPLICATION FILED JUNE 21, 1902.
NO MODEL.
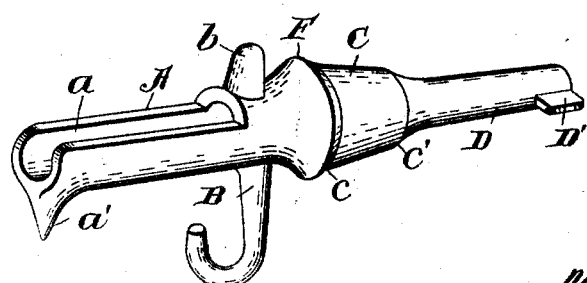
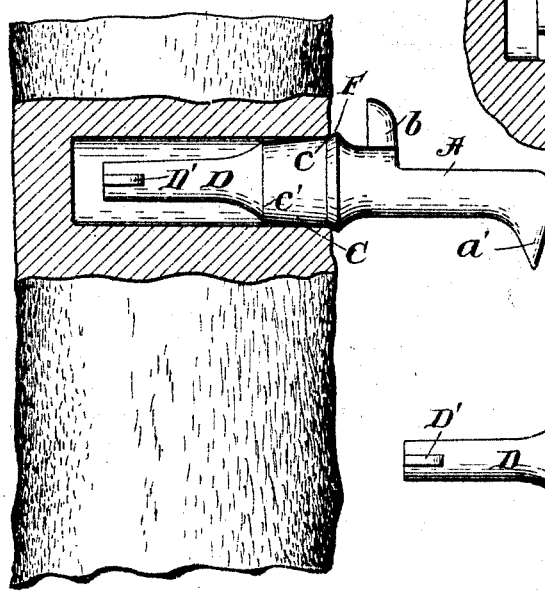
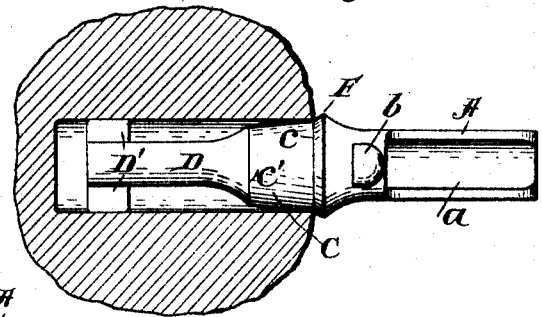
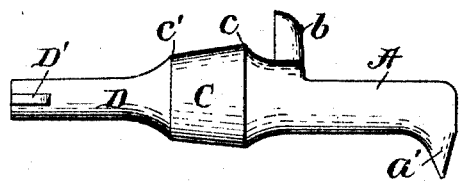
Witnesses
Geo. E. Prech.
Alice W. Hoffman
By
Inventor
James F. Warner,
A. S. Pattison.
Attorney No. 764,324. Patented July 5, 1904.

UNITED STATES PATENT OFFICE.

JAMES F. WARNER, OF ESSEX, VERMONT, ASSIGNOR TO GEORGE D. JARVIS AND CO., OF BURLINGTON, VERMONT, A CORPORATION OF VERMONT.

SAP-SPOUT.

SPECIFICATION forming part of Letters Patent No. 764,324, dated July 5, 1904.

Application filed June 21, 1902. Serial No. 112,679. (No model.)

*To all whom it may concern:*

Be it known that I, JAMES F. WARNER, a citizen of the United States, residing at Essex, in the county of Chittenden and State of Vermont, have invented new and useful Improvements in Sap-Spouts, of which the following is a specification.

My invention relates to improvements in sap-spouts, and pertains more particularly to those used in maple trees for drawing the sap therefrom.

The object of my invention is to provide a sap-spout which is adapted to obtain the greatest amount of sap from a hole of predetermined size.

A still further object of my invention is to provide a spout which will avoid the breaking and mashing of the bark around the opening, and thus prevent the decaying of the trees, thus lengthening the life of the trees and causing the trees to give better results after successive tapping.

A still further object of my invention is to provide a simple, cheap, durable, and more effective sap-spout.

In the accompanying drawings, Figure 1 is a perspective view of my sap-spout. Fig. 2 is a side view showing the spout in the tree. Fig. 3 is a top plan view of my spout within the tree. Fig. 4 is a side view of a slight modification.

Referring now to the drawings, A represents the portion of the spout which is outside of the tree and may be of any form, but preferably of that form shown in the drawings. The upper portion in this form is cut away at *a* and is provided at its extreme outer end with the drip-tongue *a'*. The said portion A is provided with a downwardly-extending hook B, by means of which the bucket is supported; but this could be left off, as it forms no part of my invention. Above said hook is an upwardly-projecting member *b*, which aids in the withdrawing of the spout from the tree. Adjacent said hook and projection there is an enlarged portion C, which rests within the opening in the tree, to be hereinafter more fully described. The said enlarged portion commences to taper from the point *c* and tapers very gradually to the point *c'*, where it is provided with the elongated outwardly-reduced portion D. The said spout has a centrally-extending opening extending through the entire length thereof and through which the sap may flow from the opening. In order that the spout may be firmly held within the auger-hole and at the same time allow the free flow of sap from all of the grain that has been cut by the boring of said hole, I provide opposite sides of the said outwardly-reduced portion D with laterally-extending horizontal elongated fins D', which are of a length to extend out on a line even with the enlarged tapered portion, so that when the spout is driven home the said fins will engage the sides of the hole, and thus firmly hold the spout within the tree. It will be readily seen that by having the fins on the sides they will engage the grains of wood on the sides of the opening that have not been severed, and as only the grains that have been severed issue sap the flow of sap is not in the least interrupted, as it will flow only from the top and bottom of said opening.

The portion C being tapered, as clearly shown, when the spout is driven home it is wedged within the opening; but at the same time the taper is so gradual that it will not break the outer or inner bark of the tree, but will completely close the opening, so that the sap cannot flow therefrom around the spout, but will flow through the opening in the spout. The tapered portion is such that no portion thereof will engage the walls of the opening beyond the bark, and thus the sap from all of the grains of wood is allowed to flow within the opening and find its way back and out through the opening in the spout. I also provide the spout with the tapered beading or circular flange F, which is adapted to engage the outer portion of the opening and more securely close the opening around the spout, so that the sap is less liable to flow or leak out; but said beading or flange is tapered, as clearly shown, and thus will not break or tear the bark around the opening.

Having thus described my invention, what I claim, and desire to secure by Letters Patent, is—

A sap-spout consisting of a body portion, a tapering plugging portion carried thereby, a beveled plugging-flange adjacent the outer end of said tapering plugging portion, a reduced rounded inner end carried by the tapering plugging portion, and oppositely-extending horizontal lateral fins carried by the inner end of the reduced rounded portion and the outer edges of said fins in a line with the outer end of the tapering plugging portion.

In testimony whereof I have hereunto set my hand in the presence of two subscribing witnesses.

JAMES F. WARNER.

Witnesses:
GEO. D. JARVIS,
CHARLES E. ALLEN.